United States Patent [19]

Dan et al.

[11] Patent Number: 4,595,183
[45] Date of Patent: Jun. 17, 1986

[54] VIBRATION ISOLATING DEVICE

[75] Inventors: Takuya Dan; Hiroshi Kojima; Michihiro Orikawa, all of Yokohama, Japan

[73] Assignee: Bridgestone Tire Company Limited, Tokyo, Japan

[21] Appl. No.: 586,500

[22] Filed: Mar. 5, 1984

[30] Foreign Application Priority Data

Mar. 9, 1983 [JP] Japan ............................. 58-34453[U]
Apr. 13, 1983 [JP] Japan ............................. 58-55002[U]
Jul. 13, 1983 [JP] Japan ........................... 58-108449[U]

[51] Int. Cl.$^4$ ........................ F16M 1/02; B60G 13/00
[52] U.S. Cl. ............................... 267/140.1; 267/8 R; 267/63 A
[58] Field of Search ................. 267/64.27, 140.1, 141, 267/141.1, 141.2, 141.3, 141.4, 141.5, 141.6, 141.7, 64.13, 64.19, 152, 64.25, 35, 64.11, 8 R, 113; 188/269, 278, 298, 378, 379; 248/562, 563, 566, 634

[56] References Cited

U.S. PATENT DOCUMENTS 4,159,091 6/1979 Le Salver et al. ................. 248/562
4,407,491 10/1983 Kunihiro et al. ................. 267/140.1

FOREIGN PATENT DOCUMENTS 2500555 8/1982 France ............................. 188/264
0065440 4/1982 Japan ............................... 267/35
2068079 8/1981 United Kingdom ............. 267/140.1

Primary Examiner—Duane A. Reger
Assistant Examiner—Alvin Oberley
Attorney, Agent, or Firm—Sughrue, Mion, Zinn, Macpeak, and Seas

[57] ABSTRACT

A vibration isolating device is disclosed, which comprises two vibration-damping fluid chambers, and a partition member interposed between the two fluid chambers and provided with a restricted passage. In this device, an auxiliary vibration-damping unit is arranged in one of the two fluid chambers subjected to vibrations from vibration source.

5 Claims, 14 Drawing Figures

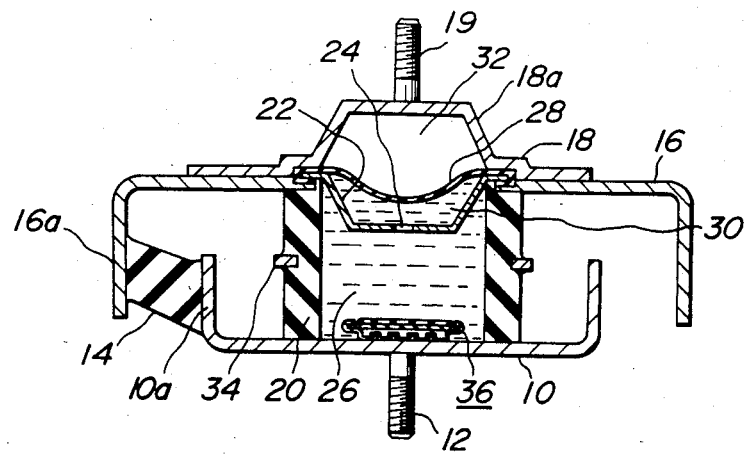
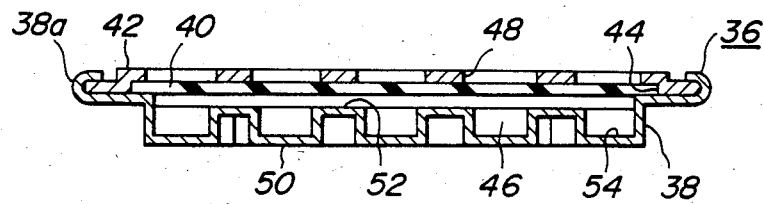
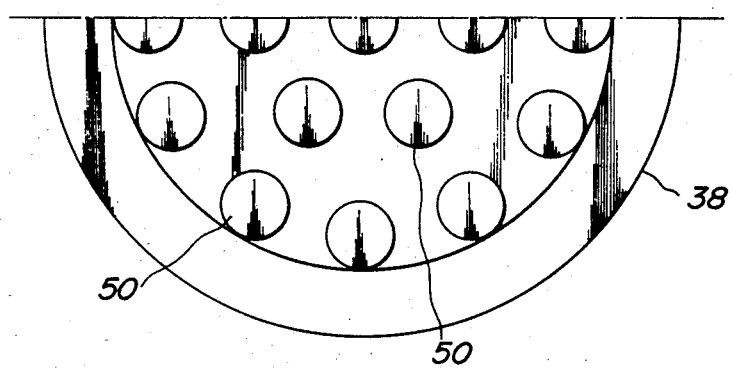

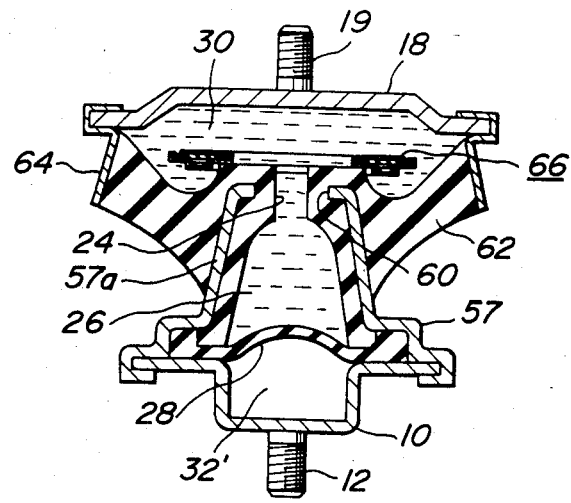
FIG_4
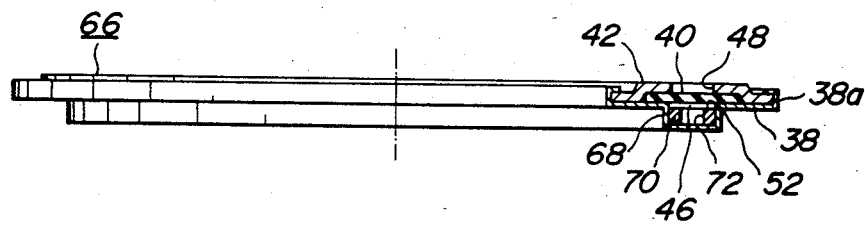
FIG_5
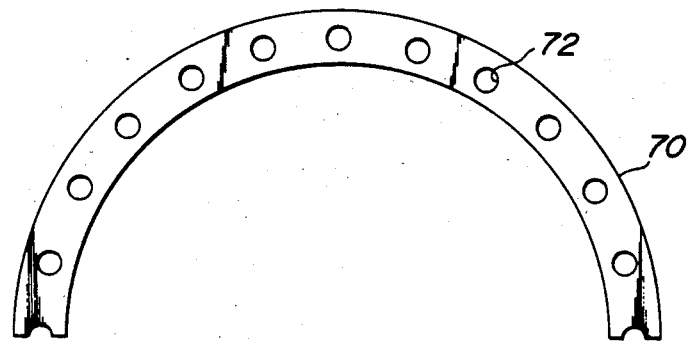
FIG_6

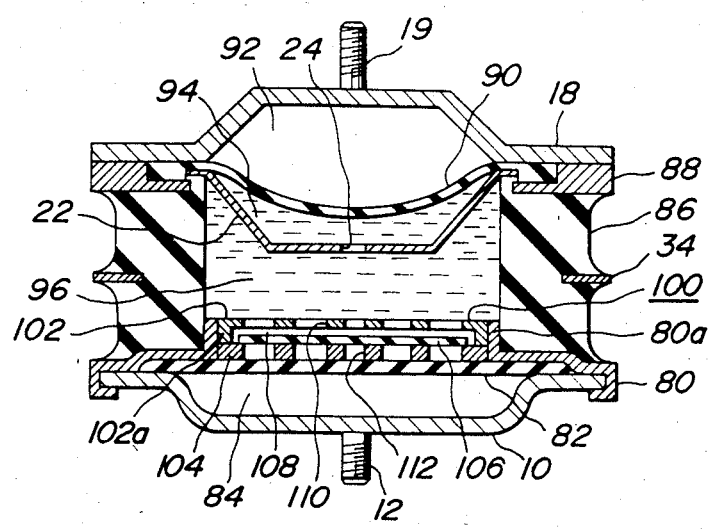
FIG_7
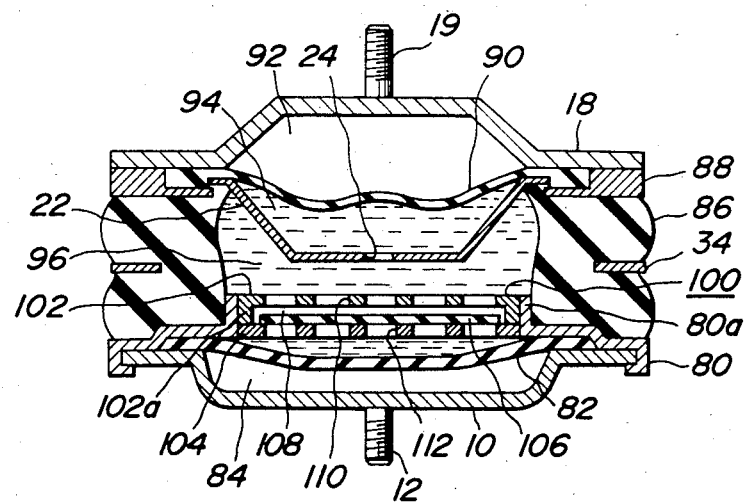
FIG_8

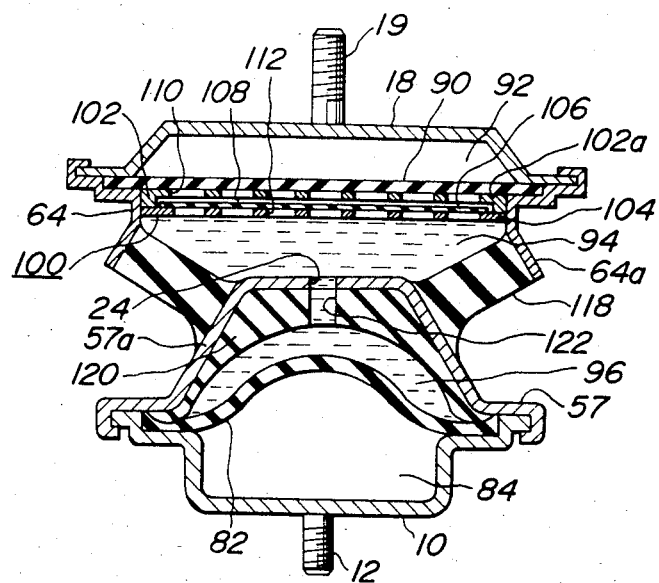
FIG_9
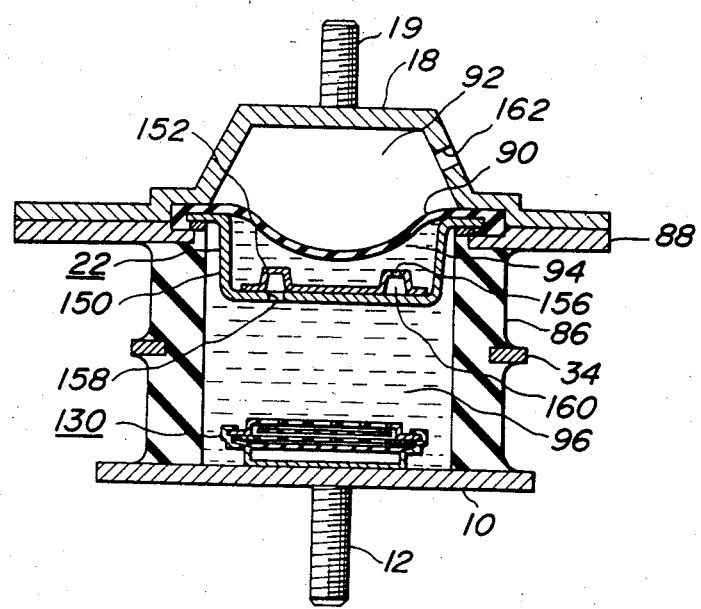
FIG_10

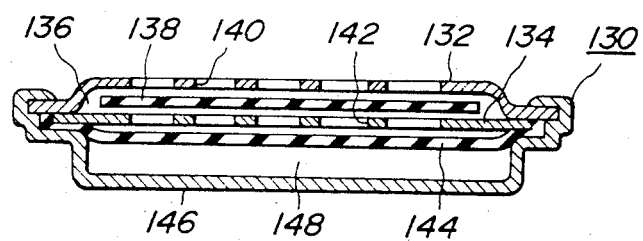
FIG_11
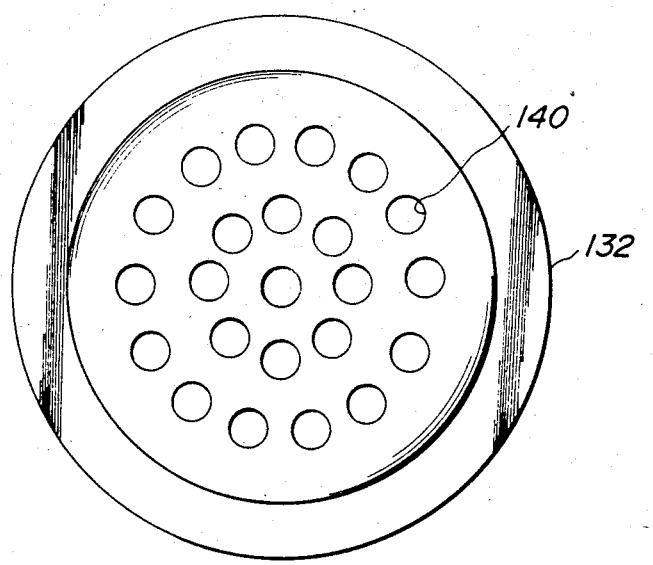
FIG_12

VIBRATION ISOLATING DEVICE

BACKGROUND OF THE INVENTION

This invention relates to a vibration isolating device for damping vibrations from vibration source.

The vibration isolating device generally known as a rubber vibration isolator is used, for instance, as an engine mount for automobile vehicles, whereby vibrations from an internal-combustion engine are absorbed so as not to be transmitted to a vehicle chassis.

A proposed vibration isolating device of this type comprises two vibration-damping fluid chambers separated by an orifice-formed partition, in which vibrations from vibration source are absorbed by a flow resistance subjected to the fluid when the vibration is transmitted to the one chamber. This allows flow of the fluid from the one chamber to the other through the orifice.

Such a conventional vibration isolating device is effective for damping the vibrations of low frequency, but is not effective against vibrations to be input having a high frequency of, for example, about 50 Hz or more. In the latter case, since the amplitude of the vibration is small, the orifice is in a clogged state, so that the internal pressure of the fluid chamber rises and also the spring constant increases. As a result, the vibration transmissibility inversely increases to deteriorate the ride feeling on the vehicle.

SUMMARY OF THE INVENTION

Under the above situations, it is an object of the invention to provide a vibration isolating device capable of damping vibrations over a wide frequency range inclusive of high frequency.

According to the invention, there is the provision of in a vibration isolating device comprising two vibration-damping fluid chambers, and a partition member interposed between said two fluid chambers and provided with a restricted passage, the improvement wherein an auxiliary vibration-damping unit is arranged in one of said two fluid chambers subjected to vibrations from vibration source.

In a preferred embodiment of the invention, the auxiliary vibration-damping unit constitutes a part of the fluid chamber.

The auxiliary vibration-damping unit to be used in the invention fundamentally comprises an elastic film and a pair of deformation-restricting members for the elastic film housing the elastic film therebetween. In this case, the elastic film may be freely movable in a space defined by these deformation-restricting members or the peripheral end of the elastic film may be clamped between the deformation-restricting members. Further, one or both of the deformation-restricting members are required to be a perforated plate. In the auxiliary vibration-damping unit of the above mentioned structure, a flexible diaphragm may be disposed outside one of the deformation-restricting members, or a plate member may further be disposed outside the flexible diaphragm so as to define a closed air chamber together therewith.

BRIEF DESCRIPTION OF THE DRAWING

The invention will now be described in detail with reference to the accompanying drawings, wherein:

FIG. 1 is a sectional view of a first embodiment of the vibration isolating device according to the invention;

FIG. 2 is a sectional view of an auxiliary vibration-damping unit used in the device of FIG. 1;

FIG. 3 is a partial bottom view of the unit shown in FIG. 2;

FIG. 4 is a sectional view of a second embodiment of the vibration isolating device according to the invention;

FIG. 5 is an elevational view partly shown in section of an auxiliary vibration-damping unit used in the device of FIG. 4;

FIG. 6 is a partial plan view of a ring plate used in the unit of FIG. 5;

FIG. 7 is a sectional view of a third embodiment of the vibration isolating device according to the invention;

FIG. 8 is a sectional view illustrating the working state of the device shown in FIG. 7;

FIG. 9 is a sectional view of a fourth embodiment of the vibration isolating device according to the invention;

FIG. 10 is a sectional view of a fifth embodiment of the vibration isolating device according to the invention;

FIG. 11 is a sectional view of an auxiliary vibration-damping unit used in the device of FIG. 10;

FIG. 12 is a plan view of a deformation-restricting member for an elastic film used in the unit of FIG. 11;

Like parts are designated by like numerals throughout the different figures of the drawing.

DESCRIPTION OF THE PREFERRED EMBODIMENTS

Figure 13:
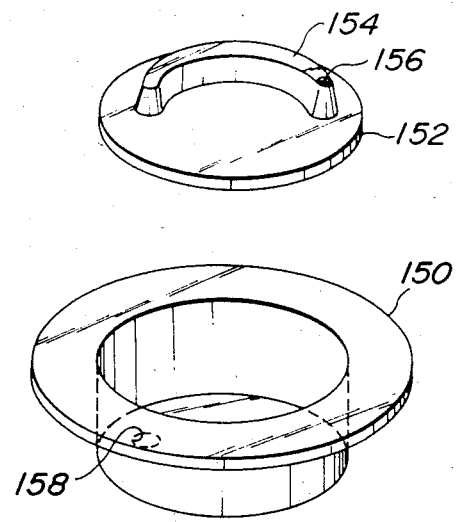
FIG. 13 is an exploded perspective view of a partition member used in the device of FIG. 10.

FIG. 1 is sectionally shown a first embodiment of the vibration isolating device according to the invention, which is used as an engine mount for automobile vehicle. This vibration isolating device comprises a rigid lower disc 10 provided with a fitting bolt 12, which is fixed to a vehicle chassis (not shown).

A rubber elastomer 14 is bonded by vulcanization at the inner surface to an outer peripheral surface of an extended portion 10a bent upward from the outer periphery of the lower disc 10 on one hand and at the outer surface to an inner peripheral surface of an extended portion 16a bent downward from an outer periphery of a rigid upper disc 16 on the other hand.

A circular hole is made on the central portion of the upper disc 16, around which a rigid top disc 18 is fixed to the upper disc 16. The top disc 18 is raised at its central portion (18a) and provided with a fitting bolt 19 for carrying and fixing an engine (not shown).

A cylindrical rubber elastomer 20 is interposed between the upper disc 16 and the lower disc 10. That is, the rubber elastomer 20 is coaxially bonded at its upper and lower ends by vulcanization to the upper disc 16 and the lower disc 10. Further, a partition member 22 is clamped at its outer peripheral portion between the upper disc 16 and the top disc 18 and the central portion thereof is recessed toward the lower disc 10 and provided at its center with a restricted passage or an orifice 24.

Thus, the interior of the cylindrical rubber elastomer 20 forms a lower vibration-damping fluid chamber 26 together with the partition member 22 and the lower disc 10.

On the other hand, an elastic diaphragm 28 is clamped at its outer peripheral portion on the partition member 22 between the upper disc 16 and the top disc 18, whereby an upper vibration-damping fluid chamber 30 is defined between the elastic diaphragm 28 and the partition member 22. At the same time, an air chamber 32 is defined between the elastic diaphragm 28 and the upheaved portion 18a of the top disc 18. The air chamber 32 can prevent the boiling of liquid filled in the upper and lower fluid chambers 30, 26 at the rising of ambient temperature because air in the chamber 32 expands and pushes down the elastic diaphragm 28. If necessary, the air chamber 32 may communicate with the exterior of the damper.

Moreover, a ring member 34 is put on the outer surface of the cylindrical rubber elastomer 20 at the middle part thereof in the up and down direction to adjust the spring constant of the elastomer 20, which also serves as a stopper when the extended portion 10a of the lower disc 10 is moved in the lateral direction.

According to the invention, an auxiliary vibration-damping unit 36 is arranged on the lower disc 10 inside the lower fluid chamber 26, which is subjected to vibrations from the engine, in the vibration isolating device shown in FIG. 1. This auxiliary unit 36 has a structure as shown in FIGS. 2 and 3 and comprises an elastic film 40 and a pair of deformation-restricting members 38, 42 for the elastic film 40.

The deformation-restricting member 38 is a disc-shaped body provided at its outer peripheral end with a folded portion 38a. The other deformation-restricting member 42 is fixed at its outer periphery to the member 38 by caulking of the folded portion 38a. A stepped portion 44 is formed on the deformation-restricting member 42 near the outer peripheral end thereof to isolate the central portion of the member 42 from the member 38, while the outer periphery of the elastic film 40 is airtightly clamped between the members 38 and 42 at the stepped portion 44, whereby a closed air chamber 46 is defined between the deformation-restricting member 38 and the elastic film 40.

The elastic film 40 is made, for example, of a rubber sheet with a thickness of 1 mm. The movement of the elastic film 40 is restricted at the surface facing the lower fluid chamber 26 by the deformation-restricting member 42. Moreover, the deformation-restricting member 42 is a perforated plate having a plurality of circular apertures 48 for transmitting the pressure of the lower fluid chamber 26 to the elastic film 40.

In order to enlarge the volume of the closed air chamber 46, a plurality of cylindrical protrusions 50 are formed in the deformation-restricting member 38. As shown in FIGS. 2 and 3, the closed air chamber 46 is made into a rugged shape having flat stopping surfaces 52 near the elastic film 40 and bottom surfaces 54 apart from the film 40.

The vibration isolating device of the above mentioned structure is mounted on the automobile vehicle by fixing the lower disc 10 to the vehicle chassis (not shown) through the bolt 12 and carrying the engine (not shown) on the top disc 18 through the bolt 19.

In the operation of the engine, vibrations generated from the engine are transmitted to the vibration isolating device through the top disc 18. If the frequency of the generated vibration is low, the amplitude of the vibration is large, so that the elastic film 40 is significantly deformed and closely contacted with the flat stopping surfaces 52 of the deformation-restricting member 38, whereby the movement of the film 40 is restrained completely. As a result, the liquid in the lower fluid chamber 26 flows into the upper fluid chamber 30 through the orifice 24, during which vibrations are absorbed by the viscosity resistance caused in the flowing of the liquid through the orifice to produce an effective vibration damping effect.

On the other hand, if the vibration generated from the engine has a high frequency of, for example, 50 Hz or more, the amplitude of this vibration is small, so that it is desired not to raise the pressure inside the lower fluid chamber 26. For this purpose, according to the invention, the auxiliary vibration-damping unit 36 is arranged in the lower fluid chamber 26. That is, when the high frequency vibration is applied to the vibration isolating device, the elastic film 40 in the auxiliary unit 36 is finely deformed by the slight rising of the pressure inside the lower fluid chamber 26 to reduce the volume of the closed air chamber 46, whereby the vibration is absorbed and at the same time the pressure rising inside the chamber 26 is prevented so as not to raise the spring constant of the vibration isolating device.

In the first embodiment illustrated in FIG. 1, therefore, vibrations having a wide frequency range can be absorbed by the synergistic action of the two vibration-damping fluid chambers and the auxiliary vibration-damping unit. Moreover, the auxiliary vibration-damping unit 36 may be secured at a proper position to the inner surface of the cylindrical rubber elastomer 20 or the lower disc 10 in the lower fluid chamber 26.

In FIG. 4 is shown a second embodiment of the vibration isolating device according to the invention. As shown in FIG. 4, an inner shell 57 is fixed by caulking at one end to the outer peripheral portion of the lower disc 10, a central portion of which being protruded downward, and provided at its central part with an upright portion 57a. Further, the elastic diaphragm 28 is airtightly clamped at the outer periphery between the inner shell 57 and the lower disc 10 to define an air chamber 32' therebetween. In the inner shell 57, a circular hole 60 is formed in the top of the upright portion 57a. A rubber elastic member 62 is bonded by vulcanization to the inner and outer peripheries of the upright portion 57a so that the restricted passage or orifice 24 formed in the member 62 is located around the circular hole 60. The outer peripheral portion of the member 62 is bonded by vulcanization to an inner surface of an outer shell 64 clamped to the outer periphery of the top disc 18.

Thus, the upper vibration-damping fluid chamber 30 is defined between the top disc 18 and the rubber elastic member 62, while the lower vibration-damping fluid chamber 26 is defined between that portion of the member 62 which is bonded to the inner peripheral surface of the upright portion 57a and the elastic diaphragm 28.

In the second embodiment, an auxiliary vibration-damping unit 66 is arranged in the upper fluid chamber 30 subjected to vibrations from the engine (not shown).

The auxiliary vibration-damping unit 66 is shaped into a ring as shown in FIGS. 5 and 6, the section of which in the circumferential direction is similar to that of the first embodiment. That is, the auxiliary unit 66 comprises a ring-shaped elastic film 40 and a pair of ring-shaped deformation-restricting members 38 and 42 for the elastic film 40, wherein the member 42 is fixed to the member 38 by caulking of the folded portion 38a and the film 40 is airtightly clamped between the members 38 and 42 to define the closed air chamber 46.

In the auxiliary unit 66, a ring protrusion 68 is formed in the member 38 for enlarging the volume of the closed air chamber 46, and a ring plate 70 having a plurality of circular holes 72 as shown in FIG. 6 is received in the protrusion 68 as shown in FIG. 5. Thus, the top surface of the ring plate 70 housed in the ring protrusion 68 acts as a flat stopping surface 52. Moreover, a plurality of small circular holes 48 is formed in the member 42 for transmitting the pressure of the upper fluid chamber 30 to the elastic film 40.

In the second embodiment, the auxiliary vibration-damping unit 66 can positively absorb vibrations of high frequency generated from the engine, so that vibrations with a wide frequency range generated from the engine can also be absorbed by the vibration isolating device of this embodiment.

In FIGS. 7 and 8 is sectionally shown a third embodiment of the vibration isolating device according to the invention.

In this embodiment, a lower annular plate 80 is fixed by caulking to the outer periphery of the lower disc 10 having a downwardly protruded central portion, while a lower diaphragm 82 composed of an elastic material is clamped at the outer periphery between the lower disc 10 and the lower annular plate 82. Thus, a lower air chamber 84 is defined between the central protruded portion of the lower disc 10 and the lower diaphragm 82, wherein the diaphragm 82 is displaced so as to reduce the volume of the lower air chamber 84.

To the upper surface of the lower annular plate 80 is bonded a lower end portion of a cylindrical rubber member 86 by vulcanization. For the member 86, other elastic material may be used instead of rubber. On the other hand, an upper annular plate 88 is bonded to the upper end portion of the cylindrical rubber member 86, while the top disc 18 is fixed to the upper surface of the upper annular plate 88.

Between the top disc 18 and the upper annular plate 88 is clamped the outer periphery of the partition member 22 through the rubber member 86, while an upper diaphragm 90 composed of an elastic material is clamped at the outer periphery between the partition member 22 and the top disc 18. Thus, an upper air chamber 92 is defined between the upper diaphragm 90 and the top disc 18, wherein the upper diaphragm 90 is displaced to enlarge and reduce the volume of the upper air chamber 92.

A damping liquid is filled in a space defined by the upper diaphragm 90, lower diaphragm 82 and rubber member 86 to form a fluid chamber. This fluid chamber is divided by the partition member 22 into an upper chamber 94 and a lower chamber 96, both of which communicate with each other through a circular restricted passage or orifice 24 formed in the partition member 22.

With an increase of ambient temperature, the boiling of the liquid is prevented by pressurizing the fluid chambers 94, 96 by air in the chambers 84, 92 through the diaphragms 82, 90. Moreover, each of these air chambers 84, 92 may be communicated with an exterior.

In the third embodiment according to the invention, an auxiliary vibration-damping unit 100 is arranged in the lower fluid chamber 96 subjected to vibration from the engine (not shown). The auxiliary vibration-damping unit 100 comprises an upper deformation-restricting member 102 provided at its outer periphery with a downwardly projecting portion 102a, a lower deformation-restricting member 104, and an elastic film 106 interposed between the members 102 and 104. Both of the upper and lower members 102 and 104 are disc-type, which are closely inserted inside an upright portion 80a formed by bending the inner peripheral portion of the lower annular plate 80 upward. Moreover, the outer peripheral surface of the upright portion 80a is also bonded with the rubber member 86 by vulcanization.

In the auxiliary unit 100, a displacement space 108 is defined between the upper and lower members 102 and 104 through the downward projecting portion 102a. Each of the upper and lower members 102 and 104 is provided with a plurality of holes 110 or 112 for communicating the displacement space 108 with the lower fluid chamber 96. The elastic film 106 disposed in the displacement space 108 is a disc composed of an elastic material such as rubber or the like, whose thickness and outer diameter being smaller than those of the displacement space 108. Therefore, the elastic film 106 is freely and finely movable in the displacement space 108.

In the auxiliary unit 100 of the above structure, the liquid filled in the lower fluid chamber 96 freely flows into the displacement space 108 through the holes 110 and 112. Moreover, in order to more facilitate the flowing of the liquid in the space 108, the opposed surfaces of the upper and lower members 102 and 104 facing the space 108 may be made rough or fine through-holes may be formed in the elastic film 106.

Furthermore, the ring member 34 is embedded in the outer peripheral portion of the rubber member 86 at the center in up and down direction so as to control the expansion of the outer diameter in the rubber member 86 within the required range.

When the vibration isolating device of the third embodiment is used as an engine mount for the automobile vehicle (not shown), the weight of the engine is applied to the top disc 18, whereby the liquid pressure in the upper and lower fluid chambers 94 and 96 is raised as shown in FIG. 8. That is, the pressure increase of the upper fluid chamber 34 pushes up the upper diaphragm 90 to reduce the volume of the upper air chamber 92, while the liquid in the lower fluid chamber 96 pushes down the lower diaphragm 82 through the holes 110, 112 in the auxiliary unit 100 by the pressure increase of the lower fluid chamber 96 to reduce the volume of the lower air chamber 84. Even at such a deformation state, the elastic film 106 is freely movable in the displacement space 108, so that it is never forced on the deformation-restricting member 102 or 104 by the pressure increase of the lower fluid chamber 96.

In the operation of the engine, vibrations generated from the engine are transmitted to the vibration isolating device through the top disc 18. Since the rubber member 86 in this device acts as a vibration-absorbing main body, the vibrations can be absorbed by the vibration-damping performance based on the internal friction of the rubber member 86. Moreover, when the vibration frequency is low, the liquid freely flows between the upper and lower fluid chambers 94 and 96 through the orifice 24, during which the low frequency vibration can be effectively absorbed by a damping action based on the viscosity resistance produced in the flowing of the liquid through the orifice 24. On the other hand, when vibrations generated from the engine has a high frequency of, for example, 50 Hz or more, since the amplitude of such vibrations is small, there is a possibility of producing the clogging of the orifice 24. In this case, however, the elastic film 106 in the auxiliary unit 100 finely oscillates in the displacement space 108 to absorb the high frequency vibrations, so that there is caused no pressure increase of the lower fluid chamber 96 and also the rising of spring constant in the vibration isolating device is suppressed effectively, resulting in the adequate absorption of vibrations.

As mentioned above, vibrations having a wide frequency range can be absorbed even by the vibration isolating device of the third embodiment, so that the ride feeling on the vehicle can be improved considerably.

In FIG. 9 is sectionally shown a fourth embodiment of the vibration isolating device according to the invention, wherein the inner shell 57 provided with the upright portion 57a is fixed by caulking at one end to the outer peripheral portion of the lower disc 10, and the lower diaphragm 82 is airtightly clamped at the outer periphery between the upright portion 57a and the lower disc 10.

A rubber annular member 118 is bonded by vulcanization at the inner surface to the outer peripheral surface of the upright portion 57a. On the other hand, the rubber member 118 extends upward in a tapered shape gradually increasing the diameter and is bonded by vulcanization at the outer peripheral end to the inner surface of a downward tapered portion 64a of the outer shell 64, which is fixed by caulking at the upper end to the outer periphery of the top disc 18. Further, the upper diaphragm 90 is clamped at the outer periphery between the outer shell 64 and the top disc 18.

According to the fourth embodiment, the upper vibration-damping fluid chamber 94 is defined by the upper diaphragm 90, the outer shell 64, the rubber member 118 and the upright portion 57a of the inner shell 57, while the lower vibration-damping fluid chamber 96 is defined by the upright portion 57a of the inner shell 57 and the lower diaphragm 82. These two fluid chambers 94 and 96 are communicated with each other through the restricted passage or orifice 24 formed in the central portion of the upright portion 57a.

In the vibration isolating device of the fourth embodiment, the auxiliary vibration-damping unit 100 is arranged in the upper fluid chamber 94 in such a manner that it is inserted into the inner peripheral surface of the outer shell 64 near the upper diaphragm 90. The structure and function of the auxiliary unit 100 are the same as in the third embodiment.

Particularly, a lining rubber 120 is bonded by vulcanization to the inner peripheral surface of the upright portion 57a so as to align a through-hole 122 formed in the central part of the upright portion 57a with the restricted passage 24. In this case, the length of the restricted passage 24 can be optionally adjusted by varying the thickness of the lining rubber 120 at a position corresponding to the through-hole 122. Thus, a loss factor (tan δ) of the liquid can be increased by the total length of the through-hole 122 and the restricted passage 24, whereby the vibration-damping effect can be developed against vibrations having a wider frequency range.

In FIG. 10 is sectionally shown a fifth embodiment of the vibration isolating device according to the invention, wherein an auxiliary vibration-damping unit 130 is placed on the lower disc 10 in the lower vibration-damping fluid chamber 96. The auxiliary unit 130 comprises an upper deformation-restricting member 132, a lower deformation-restricting member 134, and an elastic film 138 movably retained in a displacement space 136 defined between the members 132 and 134 as shown in FIGS. 11 and 12. Each of the upper and lower members 132 and 134 is provided with a plurality of holes 140 or 142 for establishing communication between the displacement space 136 with the lower fluid chamber 96.

In the auxiliary unit 130, a lower diaphragm 144 of a disc type is arranged just below the member 134, which are fixed at their outer peripheries together to the upper member 132 by caulking an outer peripheral end of a plate member 146, which is arranged below the lower diaphragm 144, to the upper member 132. Further, the central portion of the plate member 146 is protruded downward to define a closed air chamber 148 with the lower diaphragm 144. Thus, the closed air chamber 148 has the same action as in the air chamber 84 described in the third and fourth embodiments.

The partition member 22 for separating the upper and lower fluid chambers 94, 96 comprises a hat-shaped body 150 and a disc-shaped body 152 as shown in FIG. 13. The disc-shaped body 152 is provided with an arc-shaped protrusion 154 formed by stamping or the like, i.e. a semi-circular recess is formed in the disc-shaped body 152. Further, an opening 156 is formed in one end of the protrusion 154. The disc-shaped body 152 is fixed to the recess bottom of the hat-shaped body 150 (for example, formed by stamping or the like) in such a manner that the other end of the protrusion is located on a hole 158 formed in the hat-shaped body 150. Thus, the recess portion of the body 152 extending between the openings 156 and 158 forms a restricted passage 160, wherein the openings 156 and 158 are communicated with the upper and lower fluid chambers 94 and 96, respectively. Moreover, the axial length of the restricted passage 160 can optionally be adjusted by axially changing the position of the hole 158 to the recess portion of the body 152.

In FIG. 10, a numeral 162 is an air hole formed in the top disc 18.

In the vibration isolating device of the fifth embodiment, vibrations generated from the engine can effectively be absorbed in the same manner as described in the previously mentioned embodiments. That is, low frequency vibrations can be absorbed by the damping action based on the viscosity resistance caused in the flowing of the liquid through the restricted passage 160, while high frequency vibrations can be absorbed by the fine oscillation of the elastic film 138 in the auxiliary unit 130.

Figure 14:
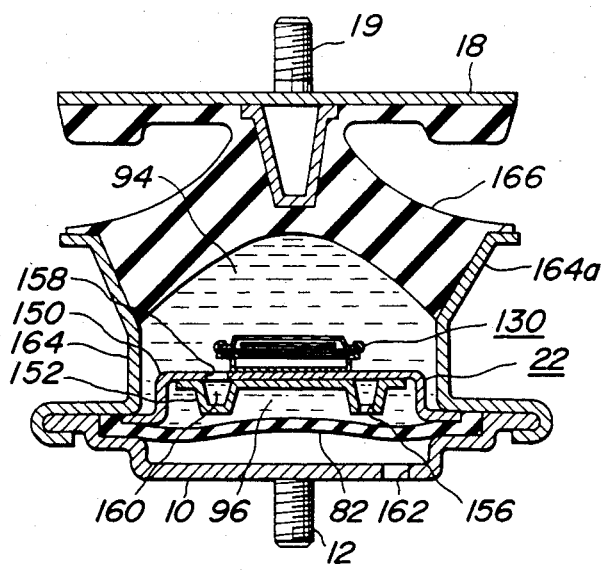
FIG. 14 is a sectional view of a sixth embodiment of the vibration isolating device according to the invention.

In FIG. 14 is sectionally shown a sixth embodiment of the vibration isolating device according to the invention, wherein a cylindrical shell 164 is fixed by caulking at one end to the outer periphery of the lower disc 10, and a rubber elastic member 166 is bonded by vulcanization at the lower and outer periphery to the inner periphery of the upper part (164a) of the cylindrical shell 164. The rubber member 166 is also bonded by vulcanization at the top surface to the top disc 18. Further, the partition member 22 and the lower diaphragm 82 are clamped at their outer peripheries between the cylindrical shell 164 and the lower disc 10 as shown in FIG. 14. Thus, the upper vibration-damping fluid chamber 94 is defined by the rubber member 166, the cylindrical shell 164 and the partition member 22, while the lower vibration-damping fluid chamber 96 is defined between the partition member 22 and the lower diaphragm 18.

The partition member 22 has the same structure as shown in FIG. 13 but is arranged in a direction opposite to the case of FIG. 10.

In the vibration isolating device of the sixth embodiment, the same auxiliary vibration-damping unit 130 as used in FIG. 10 is mounted on the partition member 22 so as not to obstruct the opening 158 of the hat-shaped body 150.

According to the invention, one or both of the deformation-restricting members for the elastic film used in the auxiliary vibration-damping unit may be a latticed plate body or a checkered plate in addition to the perforated plate.

As mentioned above, according to the invention, the auxiliary vibration-damping unit is arranged in one of two vibration-damping fluid chambers constituting the vibration isolating device, which is subjected to vibrations generated from an engine when being used as an engine mount, so that vibrations having a wider frequency range can effectively be absorbed by the synergistic action of the two fluid chambers with the auxiliary unit.

What is claimed is:

1. A vibration isolating device comprising: first and second rigid fitting members; an elastomeric block member interposed between said first and second fitting members, a diaphragm secured to one of said fitting members; a hollow chamber mainly defined by said elastomeric block member and said diaphragm and containing a vibration-damping liquid therein; and a partition member dividing said hollow chamber into two small liquid chambers and being provided with a restricted passage such that said two small chambers communicate with each other; an auxiliary vibration-damping unit arranged inside one of said two small liquid chambers facing said elastomeric block member, said auxiliary vibration-damping unit comprising an elastic film movable in response to the pressure change inside the hallow liquid chamber, a pair of deformation-restricting members housing said elastic film therebetween, and a flexible diaphragm disposed outside one of said two deformation-restricting members and defining together with a plate member disposed outside said flexible diaphragm a closed air chamber wherein said flexible diaphragm is fixed at its peripheral end between one of said two deformation-resticting members and said plate member.

2. A vibration isolating device according to claim 1, wherein said auxiliary vibration-damping unit constitutes a part of said fluid chamber.

3. A vibration isolating device according to claim 1, wherein said elastic film is freely movable in a space defined between said two deformation-restricting members.

4. A vibration isolating device according to claim 1, wherein at least one of said two deformation-restricting members is a perforated plate.

5. The vibration isolating device according to claim 1, wherein said plate member clamps on to one of said deformation-restricting members.

* * * * *